(12) United States Patent
Dietrich et al.

(10) Patent No.: US 12,015,476 B2
(45) Date of Patent: *Jun. 18, 2024

(54) DATA INVERSION TECHNIQUES

(71) Applicant: Micron Technology, Inc., Boise, ID (US)

(72) Inventors: Stefan Dietrich, Türkenfeld (DE); Thomas Hein, Munich (DE); Natalija Jovanovic, Munich (DE); Ronny Schneider, Höhenkirchen-Siegertsbrunn (DE); Michael Dieter Richter, Ottobrunn (DE); Martin Brox, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,065

(22) Filed: Feb. 10, 2023

(65) Prior Publication Data

US 2023/0188248 A1 Jun. 15, 2023

Related U.S. Application Data

(62) Division of application No. 17/149,196, filed on Jan. 14, 2021, now Pat. No. 11,601,215.

(60) Provisional application No. 62/964,505, filed on Jan. 22, 2020.

(51) Int. Cl.
*H04L 1/00* (2006.01)
(52) U.S. Cl.
CPC ................ *H04L 1/0003* (2013.01)

(58) Field of Classification Search
CPC ... H04L 1/0003; H04L 25/4927; H04L 27/06; H04L 25/06; H04L 25/4917
See application file for complete search history.

(56) References Cited

U.S. PATENT DOCUMENTS

| | | |
|---|---|---|
| 10,277,448 B1 | 4/2019 | Lu et al. |
| 2015/0146816 A1 | 5/2015 | Hollis |
| 2016/0013958 A1 | 1/2016 | Mishra et al. |
| 2016/0180897 A1 | 6/2016 | Shen et al. |
| 2017/0060803 A1 | 3/2017 | Shim |

(Continued)

OTHER PUBLICATIONS

International Search Report and Written Opinion received for PCT Patent Application No. PCT/US21/13626, dated Apr. 29, 2021, 9 pages.

*Primary Examiner* — Janice N Tieu
(74) *Attorney, Agent, or Firm* — Holland & Hart LLP

(57) ABSTRACT

Methods, systems, and devices for data inversion techniques are described to enable a memory device to transmit or receive a multi-symbol signal that includes more than two (2) physical levels. Some portions of some multi-symbol signals may be inverted. A transmitting device may determine to invert one or more data symbols based on one or more parameters. A receiving device may determine that one or more data symbols are inverted and may re-invert the one or more data symbols (e.g., to an original value). When receiving or transmitting a multi-symbol signal, a device may invert or re-invert a data symbol by changing a value of one bit of the data symbol. Additionally or alternatively, a device may invert or re-invert a data symbol of a multi-symbol signal by inverting a physical level of the signal across an axis located between or associated with one or more physical levels.

20 Claims, 7 Drawing Sheets

(56) References Cited

U.S. PATENT DOCUMENTS

2017/0141025 A1  5/2017  Lee
2019/0273640 A1  9/2019  Lin et al.

DATA INVERSION TECHNIQUES

CROSS REFERENCE

The present application for patent is a divisional of U.S. patent application Ser. No. 17/149,196 by DIETRICH et al., entitled "DATA INVERSION TECHNIQUES," filed Jan. 14, 2021, which claims the benefit of U.S. Provisional Patent Application No. 62/964,505 by DIETRICH et al., entitled "DATA INVERSION TECHNIQUES," filed Jan. 22, 2020, each of which is assigned to the assignee hereof, and each of which is expressly incorporated by reference in its entirety herein.

BACKGROUND

The following relates generally to one or more memory systems and more specifically to data inversion techniques.

Memory devices are widely used to store information in various electronic devices such as computers, wireless communication devices, cameras, digital displays, and the like. Information is stored by programing memory cells within a memory device to various states. For example, binary memory cells may be programmed to one of two (2) supported states, often denoted by a logic 1 or a logic 0. In some examples, a single memory cell may support more than two (2) states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
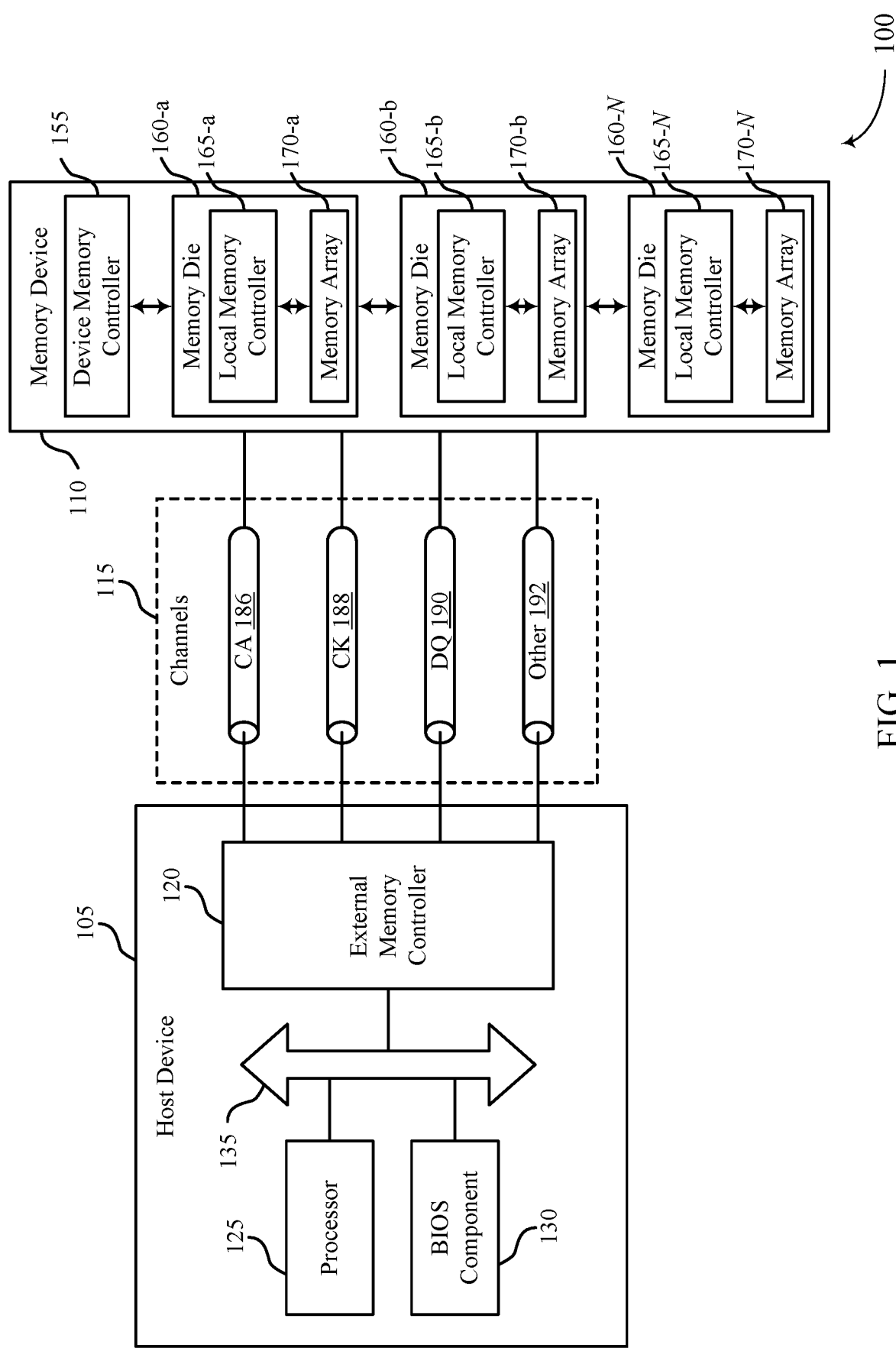
FIG. 1 illustrates an example of a system that supports data inversion techniques in accordance with examples as disclosed herein.

A memory device may transmit or receive a signal that includes more than two (2) physical levels (e.g., four (4) physical levels) and this signal may include multiple symbols of information. Such a signal may be referred to as a multi-symbol signal and may be modulated using a modulation scheme (e.g., a PAM4 modulation scheme) that relates each of the multiple physical levels to a logic level (e.g., a data symbol) that represents one or more bits of data (e.g., two (2) bits of data). The signal may be transmitted or received, for example, via a channel in communication with a host device or in communication with one or more components of the memory device.

For various reasons, a multi-symbol signal may be desired to be inverted, or at least some data bits or some data symbols of the multi-symbol signal may be desired to be inverted. For example, a transmitting device may determine to invert data to avoid cell wear (e.g., to avoid performing actions with a same logic state), for security purposes, to optimize a signal (e.g., optimize a transmission power), to reduce device activity (e.g., minimize a Hamming distance between two (2) signals), based on one or more parameters defined by an industry standard, other reasons, or a combination thereof. A receiving device may, in some examples, determine that data is inverted and may re-invert the data to an original value in order to store the data or perform actions based on the data. Some other inversion methods may be unable to invert or re-invert information, such as data (e.g., a data symbol) associated with a multi-symbol signal, or may cause increased delays or increased power consumption when inverting or re-inverting data associated with a multi-symbol signal. A defined method for data inversion for a multi-symbol signal, for example, may therefore support efficient and predictable data inversion and re-inversion.

Inversion techniques for a multi-symbol signal (e.g., a signal having at least four (4) levels) are described herein to enable efficient and predictable data inversion or re-inversion, or both. In some examples, a device may invert or re-invert a data symbol of a multi-symbol signal by changing a value of a bit (e.g., a least significant bit or a most significant bit) of the data symbol based on one or more aspects. Additionally or alternatively, a device may invert or re-invert a data symbol of a multi-symbol signal by inverting a physical level of the signal across an axis that lies between physical levels of the signal based on one or more aspects.

Features of the disclosure are initially described in the context of memory systems and dies as described with reference to FIGS. 1 and 2. Features of the disclosure are described in the context of a data processing scheme and a data inversion scheme as described with reference to FIGS. 3A-3B. These and other features of the disclosure are further illustrated by and described with reference to an apparatus diagram and flowcharts that relate to data inversion techniques as described with references to FIGS. 4-7.

FIG. 1 illustrates an example of a system 100 that supports bit and signal level mapping in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110). The memory system 100 may be referred to as a memory device or memory devices (e.g., and may also be referred to as a memory subsystem).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include various peripheral components. The peripheral components may be any input device or output device, or a set of pins for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or a set of pins with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dice 160 (e.g., memory chips) to support a desired capacity or a specified capacity for data storage. Each memory die 160 may include a local memory controller 165 (e.g., local memory controller 165-$a$, local memory controller 165-$b$, local memory controller 165-N) and a memory array 170 (e.g., memory array 170-$a$, memory array 170-$b$, memory array 170-N). A memory array 170 may be a collection (e.g., one or more grids, one or more banks, one or more tiles, one or more sections) of memory cells, with each memory cell being operable to store at least one (1) bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dice 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission media that carry information between the host device 105 and the memory device. Each channel 115 may include one or more signal paths or transmission media (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one (1) modulation symbol (e.g., signal level) of a signal may be registered for each clock cycle (e.g., on a rising or falling edge of a clock signal). In DDR signaling, two (2) modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, the CA channel 186 may include a read command with an address of the desired data. In some examples, a CA channel 186 may include any quantity of signal paths to decode one or more of address or command data (e.g., eight (8) or nine (9) signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be ×4 (e.g., including four (4) signal paths), ×8 (e.g., including eight (8) signal paths), ×16 (including sixteen (16) signal paths), etc.

In some examples, the one or more other channels 192 may include one or more error detection code (EDC) channels. The EDC channels may be operable to communicate error detection signals, such as checksums, to improve system reliability. An EDC channel may include any quantity of signal paths.

Signals communicated over the channels 115 described herein may be modulated using one or more different modulation schemes. In some examples, a binary-symbol (or binary-level) modulation scheme may be used to modulate signals communicated between the host device 105 and the memory device 110 or between components of the memory device 110. A binary-symbol modulation scheme may be an example of a M-ary modulation scheme where M is equal to two (2). Each symbol of a binary-symbol modulation scheme may be operable to represent one (1) bit of digital data (e.g., a symbol may represent a logic '1' or a logic '0'). Examples of binary-symbol modulation schemes include, but are not limited to, non-return-to-zero (NRZ), unipolar encoding, bipolar encoding, Manchester encoding, pulse amplitude modulation (PAM) having two (2) symbols (e.g., PAM2), or others.

In some examples, a multi-symbol (or multi-level) modulation scheme may be used to modulate signals communicated between the host device 105 and the memory device 110. In some examples, a multi-symbol (or multi-level) modulation scheme may be used to modulate signals communicated between components of the memory device 110 (e.g., between the device memory controller 155 and one or more memory dice 160, or between memory dice 160). A multi-symbol modulation scheme may be an example of a M-ary modulation scheme where M is greater than or equal to three (3). Each symbol of a multi-symbol modulation scheme may be operable to represent more than one (1) bit of digital data (e.g., a symbol may represent a logic '00,' a logic '01,' a logic '10,' or a logic '11'). Examples of multi-symbol modulation schemes include, but are not limited to, PAM3, PAM4, PAM8, quadrature amplitude modulation (QAM), quadrature phase shift keying (QPSK), or others. A multi-symbol signal (e.g., a PAM3 signal or a PAM4 signal) may be a signal that is modulated using a modulation scheme that includes at least three (3) levels to encode more than one (1) bit of information. Some multi-symbol signals may have a data eye width greater than or equal to two (2) data eye widths of a binary signal and may drive a same amount of information as the binary signal. Multi-symbol modulation schemes and symbols may alternatively be referred to as non-binary, multi-bit, or higher-order modulation schemes and symbols.

In some cases, a multi-symbol modulation scheme may include a quantity of logic levels and associated physical levels (e.g., amplitude, phase, time, or frequency levels). For example, a first logic level may represent bits '00' and may be associated, via the modulation scheme, with a first physical level of a signal. Similarly, a second logic level may represent bits '01' and may be associated with a second physical level of the signal. A third logic level and fourth logic level may represent bits '11' and '10,' respectively, and may be respectively associated with a third physical level and fourth physical level of the signal. The bits associated with the logic levels may, in some cases, be referred to as a symbol, and when multiple bits are included in a symbol, the symbol may be referred to as a multi-bit symbol.

In some cases, a highest physical level of the modulation scheme may be associated with logic bits '10,' instead of logic bits '11,' where such an association may be referred to as gray coding. Gray coding may be implemented to avoid changing more than one (1) bit (e.g., a least significant bit or a most significant bit) between consecutive physical levels of a signal, and may decrease an error rate of data transmitted via the signal.

The memory device 110 or host device 105 may use multi-symbol signaling to increase an amount of information transmitted using a given bandwidth of frequency resources. In some cases, a device memory controller 155 or a local memory controller 165, or both, may be configured to select a type of a modulation scheme (e.g., binary-symbol or multi-symbol) applied to a signal based on one or more parameters. Such parameters may include power consumption parameter of the memory device 110, performance of an application being implemented using the memory device 110, other parameters, or a combination thereof.

In a multi-symbol signal (e.g., a signal modulated using a multi-symbol or multi-level modulation scheme), the modulation scheme may include a larger library of symbols used to represent three (3) or more logic states. For example, if the multi-symbol signal is modulated with a modulation scheme that includes four (4) unique symbols, the multi-symbol signal may be used to represent up to four (4) logic states, '00,' '01,' '10,' and '11.' As a result, multiple bits of data may be included within a single symbol, thereby increasing an amount of data communicated using a given bandwidth. For example, a symbol may include two (2) bits of data, where one (1) bit is a least significant bit and one (1) bit is a most significant bit. In some examples, a burst length of a multi-symbol signal may be a quantity of symbols that corresponds to a quantity of clock signals. For example, a PAM4 graphics signal may have a burst length of eight (8) symbols (e.g., corresponding to two (2) clock cycles), which may correspond to sixteen (16) bits of data.

In some cases, the modulation schemes of the various signals may be amplitude modulation schemes such as PAM4 or NRZ (or both) that encode information in the amplitude (or level) of a signal (e.g., a voltage amplitude or a current amplitude). The symbols of the modulation schemes may be referred to as levels (e.g., physical levels), amplitudes, or signal strengths. For example, a first level of a signal may represent '00', a second level may represent '01', a third level may represent '11', and a fourth level may represent '10.' In some cases, a single symbol of the amplitude modulation scheme may be a constant level applied during a single symbol duration or two or more levels applied during a single symbol duration. The functions of features described herein may apply with types of modulation schemes such as phase modulation schemes, phase-shift keying modulation schemes, frequency shift keying modulation schemes, amplitude-shift keying modulation schemes, on-off keying (OOK) modulation schemes, orthogonal frequency-division multiplexing (OFDM) modulation schemes, spread-spectrum modulation schemes, time-based modulation schemes, or a combination thereof. As such, the symbols or levels of the modulation schemes may be related to signal parameters other than amplitude (e.g., phase, time, frequency).

Multi-level signaling may communicate more information given a finite amount of communication resources than binary-level signals. Additionally, use of different multi-level signaling schemes may allow a device to achieve target communication or operation metrics. A multi-level signal with a larger quantity of levels may provide more bandwidth than a multi-level signal with a smaller quantity of levels. But communicating a multi-level signal that has a larger quantity of levels may also consume more power than communication a multi-level signal that has a smaller quantity of levels. Accordingly, a device may select the quantity of levels in a multi-level signal to provide a target bandwidth or stay within a target power consummation level.

In some cases, the features and functions related to communicating multi-symbol signals and binary-symbol signals may be implemented in devices and contexts other than memory storage. For example, the features of functions described herein may be implemented in personal computing devices, laptops, servers, portable communication devices, or a combination thereof.

In some cases, a multi-symbol signal may be inverted, or at least some data bits or data symbols of the multi-symbol signal may be inverted. For example, a transmitting device may determine to invert data (or other information) based on one or more defined parameters. A receiving device may determine that data is inverted and may re-invert the data (or the other information) to an original value in order to store the data or perform actions based on the data. In a first example, a device may invert or re-invert a data symbol of a multi-symbol signal by changing a value of a bit (e.g., a least significant bit or a most significant bit) of the data symbol based on one or more aspects as described herein. Additionally or alternatively, a device may invert or re-invert a data symbol of a multi-symbol signal by inverting a physical level of the signal across an axis that lies between two consecutive physical levels of the signal based on one or more aspects as described herein.

Figure 2:
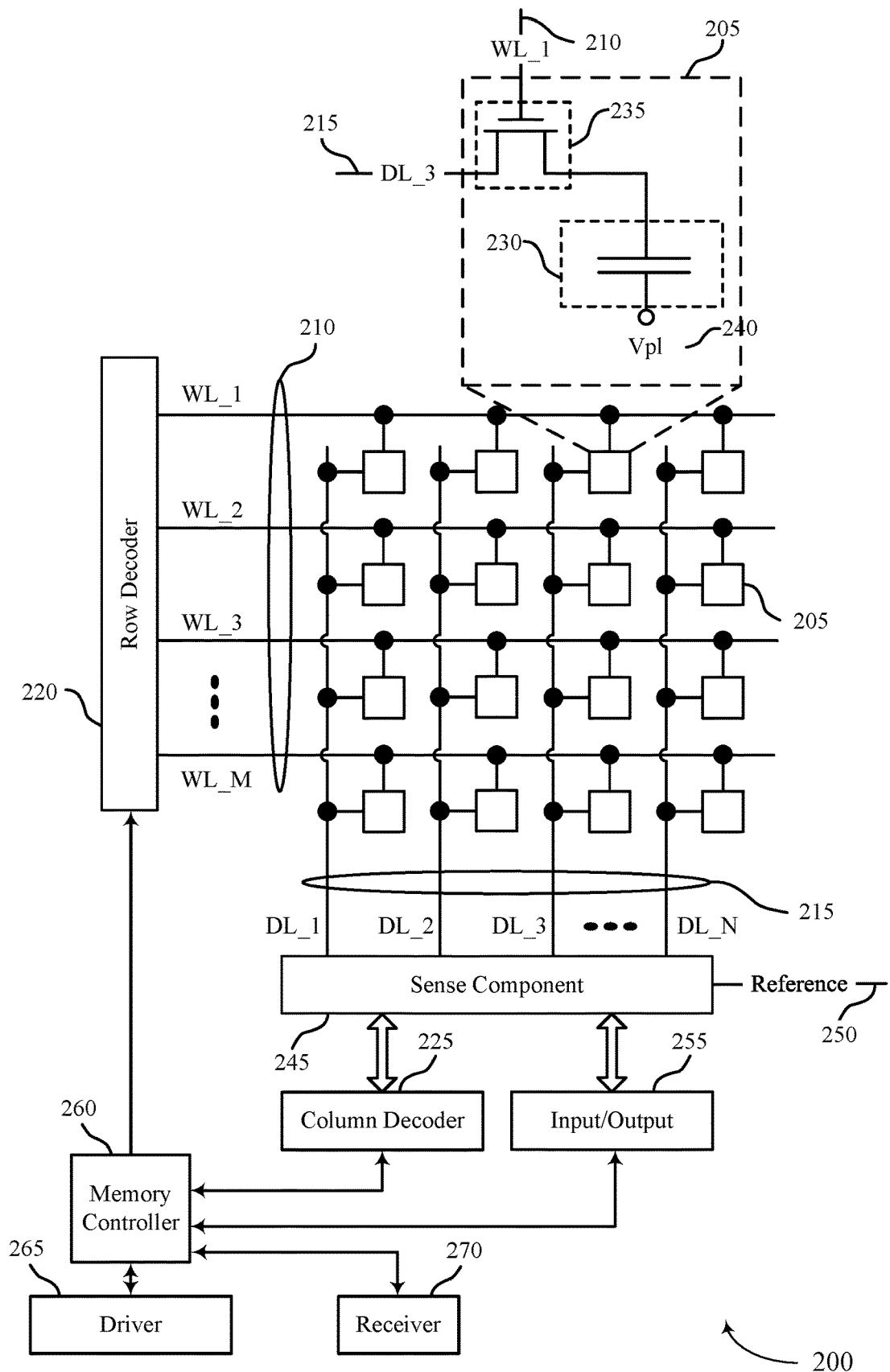
FIG. 2 illustrates an example of a memory die that supports data inversion techniques in accordance with examples as disclosed herein.

FIG. 2 illustrates an example of a memory die 200 that supports bit and signal level mapping in accordance with examples as disclosed herein. The memory die 200 may be an example of the memory dice 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., a programmed one of a set of two or more possible states). For example, a memory cell 205 may be operable to store one (1) bit of information at a time (e.g., a logic 0 or a logic 1). In some examples, a memory cell 205 (e.g., a multi-level memory cell) may be operable to store more than one (1) bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the memory controller 260 and activate a word line 210 based on the received row address. A column decoder 225 may receive a column address from the memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The memory controller 260 may control the accessing of memory cells 205 through the various components (e.g., row decoder 220, column decoder 225, sense component 245). The memory controller 260 may be an example of the local memory controller 165 or the device memory controller 155 described with reference to FIG. 1. In some examples, one or more of the row decoder 220, column decoder 225, and sense component 245 may be co-located with the memory controller 260. The memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The memory controller 260 may generate row signals and column address signals to activate the target word line 210 and the target digit line 215. The memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the memory controller 260 in response to various access commands (e.g., from a host device 105). The memory controller 260 may be operable to perform other access operations not listed here or other operations related to the operating of the memory die 200 that are not directly related to accessing the memory cells 205.

The memory controller 260 may be coupled with a driver 265 and a receiver 270. One or more components of the memory die 200, such as The driver 265 (e.g., an off-chip driver or transmitter) may be configured to map or transform a logic level associated with data (e.g., bits of data) to a physical level associated with a signal. For example, the driver 265 may be configured to use a modulation scheme having four (4) physical levels and four (4) associated logic levels. The driver 265 may be further configured to, based on the modulation scheme, map a logic level (e.g., associated with a data symbol for transmission) to a physical level of a signal, and to initiate transmission of transmit the signal. The driver 265 may also be coupled with or include an encoder that may, among other components, invert one or more data bits or data symbols associated with a signal.

The receiver 270 may be configured to map or transform a physical level associated with a signal to a logic level associated with data (e.g., a data symbol). For example, the receiver 270 may be configured to use a modulation scheme having four (4) physical levels and four (4) associated logic levels, although other examples of modulations schemes having different quantities of physical levels, logic levels, or both are contemplated and are within the scope of the disclosure. The receiver 270 may be further configured to, based on the modulation scheme, to receive a signal and map a physical level of the signal to a logic level associated with data bits. The receiver 270 may also be coupled with or include a decoder that may re-invert one or more data bits or data symbols associated with a signal.

A memory device or a host device may use a multi-symbol modulation scheme to transmit or receive a multi-symbol signal. For example, a driver 265 of a memory device may use the modulation scheme to convert a logic value of data (e.g., associated with a logic level) to a physical level of the signal (e.g., using a stored mapping that may be stored within the memory die 200 or another component, such as a stored table or using a mapping that may be received from one or more other devices such as a host device). Similarly, a receiver 270 of a memory device may use the modulation scheme to convert a physical level of the signal to a logic level and an associated logic value of data. In some cases, the memory controller 260 may also use the modulation scheme to map physical levels and logic levels (e.g., when receiving or transmitting a signal). A memory device or a host device may use the modulation scheme to transmit or receive inverted data, as described with reference to FIGS. 3A and 3B.

For example, the memory controller 260 may be configured to determine whether to invert one or more data symbols of a signal based on cell wear, device security, signal optimization, or device activity, among other examples. The memory controller 260 may also be configured to determine whether one or more data symbols of a received signal are inverted based on an indication associated with the received signal. The memory controller 260, or an encoder coupled with the memory controller 260 or with the driver 265, among other components, may be configured to invert a data symbol of a multi-symbol signal by changing a value of a bit (e.g., a least significant bit or a most significant bit) of the data symbol or by inverting a physical level of the signal across an axis that lies between consecutive physical levels of the signal. The memory controller 260, or a decoder coupled with the memory controller 260 or with the receiver 270, may be configured to re-invert a data symbol of a multi-symbol signal by changing a value of a bit (e.g., a least significant bit or a most significant bit) of the data symbol or by inverting a physical level of the signal across an axis that lies between consecutive physical levels of the signal based on one or more aspects.

Figure 3A:
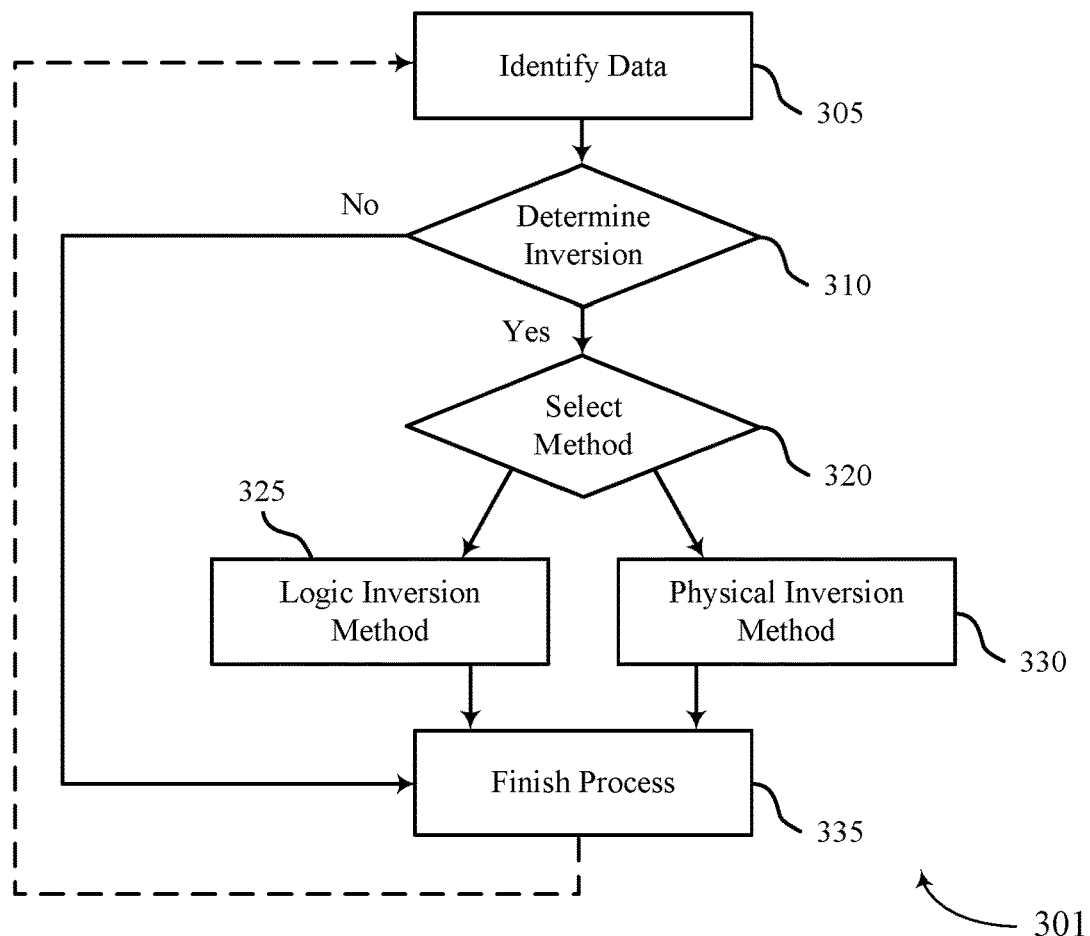
FIGS. 3A and 3B respectively illustrate an example of a data processing scheme and a data inversion scheme that support data inversion techniques in accordance with examples as disclosed herein.

FIG. 3A illustrates an example of a data processing scheme 301 that supports data inversion techniques in accordance with examples as disclosed herein. The data processing scheme 301 may be performed by a device, such as a memory device or a host device among other examples, as described with reference to FIGS. 1 and 2. For example, a controller, a driver, a receiver, or a combination thereof may perform one or more methods described with reference to the data processing scheme 301. The data processing scheme 301 may be implemented to determine whether data is inverted or is to be inverted, and to invert or re-invert the data.

In a first example, the device may represent a transmitting device and may use the data processing scheme 301 to determine whether to invert data for transmission via a multi-symbol signal (e.g., in communication with a second device). If the data is determined to be inverted, the transmitting device may further use the data processing scheme 301 to invert the data. In a second example, the device may represent a receiving device and may use the data processing scheme 301 to determine whether data received via a multi-symbol signal (e.g., in communication with a second device) is inverted (e.g., based on an indication associated with the multi-symbol signal). If the data is inverted, the receiving device may further use the data processing scheme to re-invert the inverted data (e.g., return the inverted data to an original, non-inverted value).

As described herein, a multi-symbol signal may include three (3) or more physical levels (e.g., four (4) levels) that are each associated with more than one (1) bit of data. For example, a physical level of a symbol of a multi-symbol signal may be associated with two (2) bits of data (e.g., via a modulation scheme). Some other data inversion methods may be unable to invert data (e.g., a data symbol) associated with a multi-symbol signal, or may cause increased delays or power consumption when inverting data associated with a multi-symbol signal. A defined data inversion method for a multi-symbol signal may therefore support efficient data inversion or re-inversion for data (e.g., a data symbol) associated with a multi-symbol signal.

At 305, the device (e.g., a controller of the device) may identify data associated with a multi-symbol signal. A transmitting device may identify data that is to be transmitted via a multi-symbol signal (e.g., may identify one or more data symbols for transmission). For example, a transmitting device may identify data for transmission in a buffer or in another device component, or may receive a command to transmit data, among other examples. A receiving device may identify data that has been received via a multi-symbol signal (e.g., may identify one or more received data symbols). A receiving device may identify the received data in a buffer or another device component, may receive a command including the data, or may directly identify the data from a received signal, among other examples.

At 310, the device (e.g., a controller of the device) may determine whether the identified data (e.g., or a portion of the identified data, such as one or more symbols) or other information is inverted or is to be inverted. For example, a transmitting device may determine whether to invert one or more symbols of the data for transmission via the signal. A transmitting device may determine to invert data to avoid cell wear (e.g., to avoid performing repeated actions with a same logic state), for security purposes, to optimize a signal (e.g., optimize transmission power), or to reduce device activity (e.g., minimize a Hamming distance between two (2) signals), among other examples. A transmitting device may also determine to invert data based on one or more parameters defined by an industry standard (e.g., a Graphics Double Data Rate Type 6 (GDDR6) specification). In some cases, a transmitting device may determine an indication to include in the signal, or in another signal, where the indication may indicate that at least a portion (e.g., one or more data symbols) of the data is inverted. The indication may also, in some examples, indicate which portion (e.g., which symbols) of the data is inverted. The indication may include a field of the signal (e.g., a value of the field), a value of a symbol of the signal, a value of a bit of the signal, a modulation scheme of the signal, or any combination thereof. In some cases, the indication may be set at a mode register of the device and the indication may refer or reference back to the mode register, among other examples.

A receiving device may determine whether data associated with the received signal is inverted. For example, the receiving device may determine that at least a portion of the data associated with the received signal (e.g., one or more symbols of the signal) has been inverted based on an indication associated with or included in the signal. As described with reference to the transmitting device, the indication may indicate which portion (e.g., which symbols) of the data is inverted, and the indication may include a field of the signal (e.g., a value of the field), a value of a symbol of the signal, a value of a bit of the signal, a modulation scheme of the signal, or any combination thereof. For example, a bit, a symbol, or a field associated with the signal may have a first value (e.g., '0') if data is not inverted and may have a second value (e.g., '1') if data is inverted. In some cases, the indication may be set at a mode register of the device and the indication may refer or reference back to the mode register, among other examples.

If the device determines that the data is inverted or is to be inverted, the data processing scheme may continue to 320. If the device determines that the data is not inverted or is not to be inverted, the data processing scheme may continue to 335.

At 320, the device may select an inversion method associated with the inverted data (e.g., one or more data symbols of the signal). For example, the data inversion method may be associated with a bit value (e.g., a logic level) of the data, a physical level of the signal, or a combination thereof. A first example data inversion method may be referred to as a logic inversion method and may include changing a value of a bit (e.g., a most significant bit) associated with a data symbol that is to be inverted or re-inverted. A second example data inversion method may be referred to as a physical inversion method and may include changing a physical level of the signal (e.g., a received or transmitted signal) associated with a data symbol that is to be inverted or re-inverted. If the device is configured to implement or is configured to select a logic inversion method (e.g., using circuitry), the data processing scheme 301 may proceed to 325, while if the device is configured to implement or is configured to select a physical inversion method (e.g., using circuitry), the data processing scheme 301 may proceed to 330.

In some cases, the device may be associated with a predefined data inversion method (e.g., a default data inversion method), for example, that is defined by an original equipment manufacturer (OEM), a user, or an industry standard (e.g., a GDDR6 specification). The data inversion method may be stored at the device or may be programmed into one or more components of the device (e.g., a receiver, a driver, an encoder, a decoder, or a controller). For example, if the device is configured with or is capability-limited to a predefined data inversion method (e.g., a physical inversion method or a logic inversion method), the device may perform data inversion via the predefined data inversion method. In some other cases, the device may select a data inversion method from a set of data inversion methods based on one or more factors. The one or more factors may include a signaling protocol of the device, a power consumption of the device, one or more parameters associated with the second device (e.g., a communicating device), a characteristic of the data, or any combination thereof.

At 325, if the selected data inversion method is the logic inversion method, the device may invert or re-invert the data (e.g., the one or more data symbols) by changing a value of one (1) bit for each symbol of the data that is inverted or is to be inverted. In some cases, the device may change a value of the most significant bit, or in some cases, the device may change a value of the least significant bit. For example, if a most significant bit has a value of '1', the device may change the value of the most significant bit to '0' (e.g., or vice versa for a bit having an initial value of '0'). The logic inversion method is further described with reference to FIG. 3B.

At 330, if the selected data inversion method is the physical inversion method, the device may invert or re-invert the data (e.g., the one or more data symbols) by changing a physical level of the signal for each symbol of the data that is inverted or is to be inverted. For example, the device may flip (e.g., invert, change) a physical level of a data eye of the signal (e.g., about a horizontal axis midway) between a highest physical level and lowest physical level of a modulation scheme associated with the signal. Thus, a highest physical level would be inverted to a lowest physical level, a second highest physical level would be inverted to a second lowest physical level, and so on with other physical levels. The physical inversion method is further described with reference to FIG. 3B.

At 335, the device may finish the data processing scheme 301. For example, a transmitting device may modulate and transmit the identified data (e.g., potentially including one or more inverted data symbols). A receiving device may store the identified data (e.g., potentially including one or more re-inverted data symbols) or perform one or more actions based on the identified data (e.g., perform a read operation or a write operation). In some cases, after finishing the data processing scheme 301, the device may return to 305 (e.g., for further iterations) and may restart the data processing scheme 301 (e.g., may identify new data).

Figure 3B:
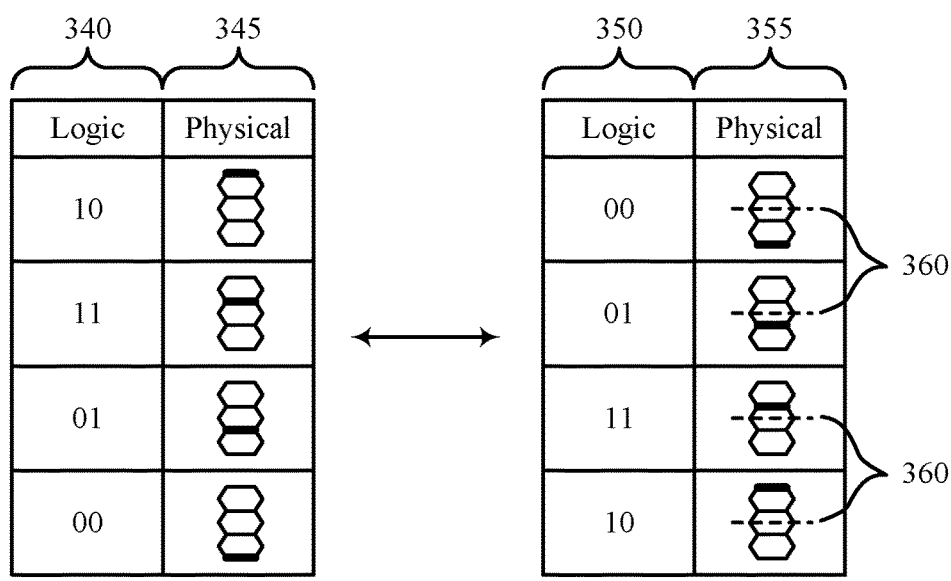

FIG. 3B illustrates an example of a data inversion scheme 302 that supports data inversion techniques in accordance with examples as disclosed herein. The data inversion scheme 302 may be used by a device, such as a memory device or a host device as described with reference to FIG. 1. For example, a controller, a driver, a receiver, an encoder, a decoder, or a combination thereof may perform one or more methods described with reference to the data inversion scheme 302. The device may use the data inversion scheme 302 to perform a logic inversion method, a physical inversion method, or a combination thereof (e.g., to invert or re-invert data), as described with reference to FIG. 3A.

Accordingly, the data inversion scheme 302 may associate logic levels 340 or physical levels 345 (or both) of a data symbol to respective inverted logic levels 350 or inverted physical levels 355 (or both) of an inverted data symbol. The association(s) indicated by the data inversion scheme 302 may be used by a transmitting device to invert one or more data symbols for transmission via a multi-symbol signal. Similarly, the association(s) indicated by the data inversion scheme 302 may be used by a receiving device to re-invert one or more inverted data symbols received via a multi-symbol signal.

When using a logic inversion method or a portion of a logic inversion method, the device may invert or re-invert a data symbol by changing a value of one (1) bit of the data symbol. In some cases, the device may change a value of the most significant bit, or in some cases, the device may change a value of the least significant bit (or another bit in some examples). For example, the device may change a value of a most significant bit from a '1' to a '0,' such that a logic level 340 (e.g., logic value) associated with the symbol changes from a '10' or a '11' to an inverted logic level 350 of '00' or '01,' respectively. Similarly, the device may change a value of a most significant bit from a '0' to a '1,' such that a logic level 340 (e.g., logic value) associated with the symbol changes from a '01' or a '00' to an inverted logic level 350 of '11' or '10,' respectively. In another example, the device may change a value of a least significant bit from a '0' to a '1' or from a '1' to a '0.' In some cases, when changing the value of the most significant bit, the least significant bit may remain unchanged, and when changing the value of the least significant bit, the most significant bit may remain unchanged.

When using a physical inversion method or a portion of a physical inversion method, the device may invert or re-invert a data symbol by changing a physical level 345 of the signal associated with the data symbol to an inverted physical level 355. For example, the device may flip or invert (e.g., change) a physical level 345 of a data eye of the signal about a horizontal axis 360 that is located midway between a highest physical level 345 and lowest physical level 345 of a modulation scheme associated with the signal. A multi-symbol signal may, in some cases, be modulated using a modulation scheme that has four (4) physical levels 345 associated with a signal. Thus, the axis 360 may be located halfway between, or at an equal distance from, a highest physical level 345 and a lowest physical level 345 of the modulation scheme, as well as being located halfway between a second physical level 345 and a third physical level 345 of the modulation scheme (e.g., between intermediate physical levels) in some examples. In other examples, the axis 360 may be located at a different location relative to one or more physical levels.

Thus, a highest physical level 345 may be changed about the axis 360 to a lowest inverted physical level 355. Similarly, a lowest physical level 345 may be changed about the axis 360 to a highest inverted physical level 355. A third physical level 345 may be changed to a second inverted physical level 355 about the axis 360 and a second physical level 345 may be changed to a third inverted physical level 355 about the axis 360.

After inverting one or more data symbols using the data inversion scheme 302 (e.g., using the logic inversion method, the physical inversion method, or a combination thereof), a transmitting device may modulate and transmit the one or more inverted data symbols. Similarly, a receiving device may receive one or more inverted data symbols and may re-invert the one or more inverted data symbols using the data inversion scheme 302 (e.g., using the logic inversion method, the physical inversion method, or a combination thereof). The receiving device may store the re-inverted data or perform one or more actions based on the re-inverted data (e.g., perform a read operation or a write operation).

Figure 4:
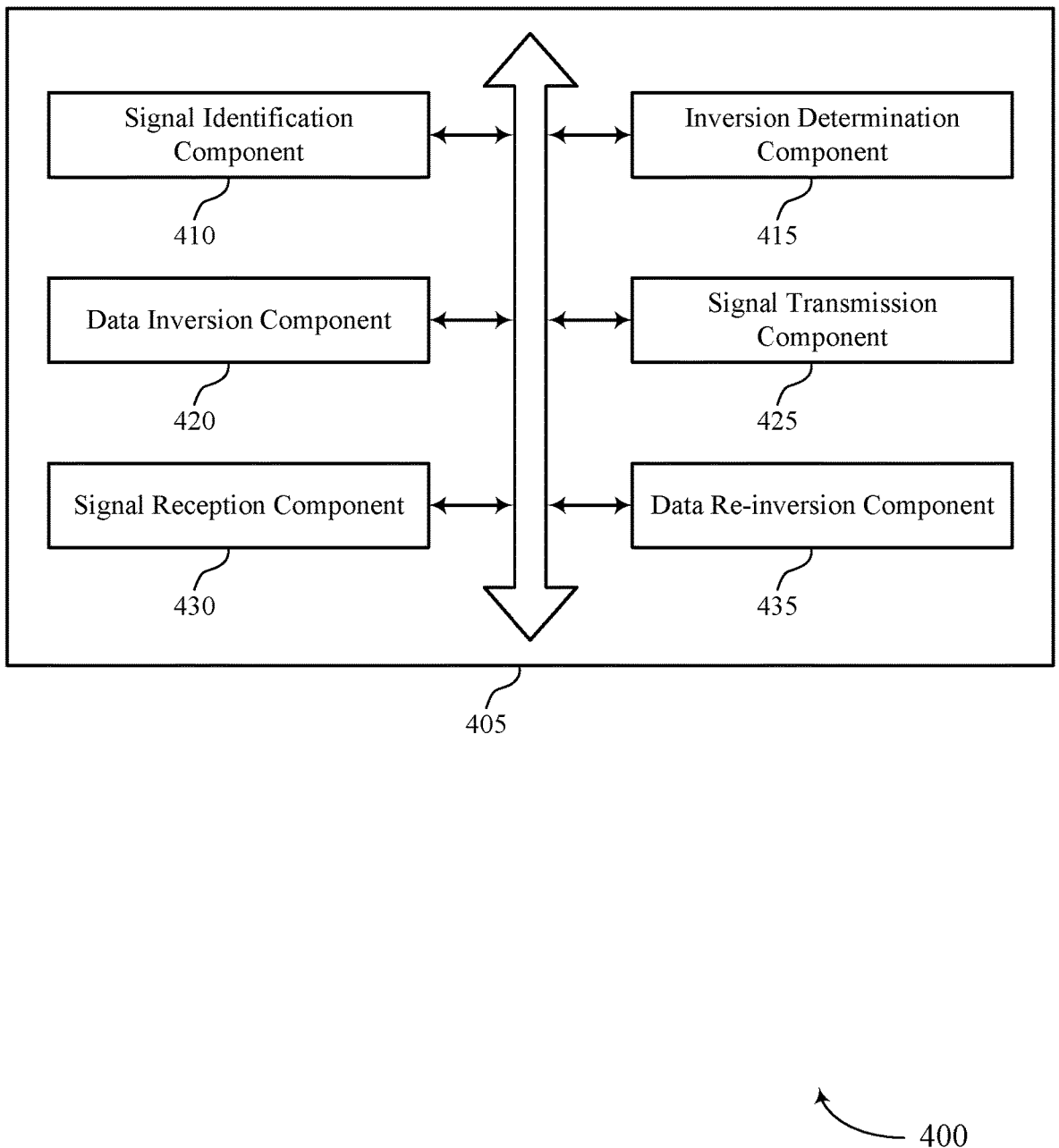
FIG. 4 shows a block diagram of a memory device that supports data inversion techniques in accordance with aspects of the present disclosure.

FIG. 4 shows a block diagram 400 of a memory device 405 that supports data inversion techniques in accordance with examples as disclosed herein. The memory device 405 may be an example of aspects of a memory device as described with reference to FIGS. 1-3. The memory device 405 may include a signal identification component 410, an inversion determination component 415, a data inversion component 420, a signal transmission component 425, a signal reception component 430, and a data re-inversion component 435. Each of these modules may communicate, directly or indirectly, with one another (e.g., via one or more buses).

The signal identification component 410 may identify, for transmission, data symbols of a signal modulated with a modulation scheme that includes at least four (4) logic levels, where each data symbol includes a most significant bit and a least significant bit. In some examples. The signal identification component 410 may also identify, for transmission, data symbols of a signal modulated with a modulation scheme that includes at least four (4) physical levels, where each data symbol includes multiple bits.

In some examples, the signal identification component 410 may map a logic level associated with each data symbol of the data symbols to a respective physical level of the at least four (4) physical levels, where transmitting the data symbols via the signal is based on mapping the logic level associated with each data symbol to the respective physical level. In some examples, the signal identification component 410 may map each data symbol of the data symbols with a respective physical level of the at least four (4) physical levels, where transmitting the data symbols is based on mapping each data symbol with the respective physical level.

In some cases, the modulation scheme further includes at least four (4) physical levels, the modulation scheme relating each physical level of the at least four (4) physical levels with a respective logic level of the at least four (4) logic levels. In some cases, the modulation scheme further includes at least four (4) logic levels that are each associated with a data symbol, the modulation scheme relating each physical level of the at least four (4) physical levels with a respective logic level of the at least four (4) logic levels.

The inversion determination component 415 may determine to invert one or more of the data symbols of the signal. In some examples, the inversion determination component 415 may determine an indication that indicates one or more of the data symbols of the signal have been inverted, where transmitting the data symbols via the signal includes transmitting the indication via the signal.

In some examples, the inversion determination component 415 may determine that one or more of the data symbols of the signal have been inverted based on an indication in the signal. In some examples, the inversion determination component 415 may determine that one or more of the data symbols of the signal have been inverted based on a value of a field of the signal, a value of a symbol of the signal, a value of a bit of the signal, the modulation scheme of the signal, or any combination thereof.

The data inversion component 420 may invert the one or more data symbols by changing a value of a bit of each of the one or more data symbols, the bit including the most significant bit or the least significant bit. In some examples, the data inversion component 420 may invert the one or more data symbols by respectively changing a physical level of at least one (1) data symbol of the one or more data symbols from a first physical level to a second physical level. In some examples, the data inversion component 420 may invert the one or more data symbols over a signal axis between a highest physical level and a lowest physical level of the at least four (4) physical levels.

In some examples, the data inversion component 420 may invert the one or more data symbols over a signal axis between a first intermediate physical level and a second intermediate physical level of the at least four (4) physical levels. In some examples, the data inversion component 420 may change the first physical level corresponding to a non-inverted data symbol of the one or more data symbols to the second physical level corresponding to an inverted data symbol, where the second physical level is located at an equal distance from the signal axis as the first physical level. In some cases, an initial physical level corresponding to a data symbol of the one or more data symbols is located at an equal distance from the signal axis as a final physical level corresponding to an inverted data symbol associated with the non-inverted data symbol.

In some examples, the data inversion component 420 may change, for each of the one or more data symbols, a value of the most significant bit from a value of 0 to a value of 1 or from a value of 1 to a value of 0.

The signal transmission component 425 may transmit the data symbols, based on inverting the one or more data symbols, via the signal modulated with the modulation scheme that includes the at least four (4) logic levels. In some examples, the signal transmission component 425 may transmit the data symbols, based on inverting the one or more data symbols, via the signal modulated with the modulation scheme that includes the at least four (4) physical levels.

The signal reception component 430 may receive data symbols via a signal modulated with a modulation scheme that includes at least four (4) logic levels, where each data symbol includes a most significant bit and a least significant bit. In some examples, the signal reception component 430 may receive data symbols via a signal modulated with a modulation scheme that includes at least four (4) physical levels, where each data symbol includes multiple bits.

In some examples, the signal reception component 430 may map the at least one (1) physical level of the signal with the respective logic level, the respective logic level associated with a data symbol of the data symbols, where receiving the data symbols is based on mapping the at least one (1) physical level with the respective data symbol. In some examples, the signal reception component 430 may map the at least one (1) physical level of the signal with a respective data symbol of the data symbols, where receiving the data symbols is based on mapping the at least one (1) physical level with the respective data symbol.

In some cases, the modulation scheme further includes at least four (4) physical levels, the modulation scheme relating each physical level of the at least four (4) physical levels with a respective logic level of the at least four (4) logic levels. In some cases, the modulation scheme includes a signal axis at a physical level between a highest physical level and a lowest physical level of the at least four (4) physical levels. In some cases, the modulation scheme includes a signal axis at a physical level at half of a distance between a first intermediate physical level and a second intermediate physical level of the at least four (4) physical levels. In some cases, the modulation scheme further includes at least four (4) logic levels that are each associated with a data symbol, the modulation scheme relating each physical level of the at least four (4) physical levels with a respective logic level of the at least four (4) logic levels.

The data re-inversion component 435 may reinvert the one or more data symbols by changing a value of the most significant bit of each of the one or more data symbols based on determining that one or more of the data symbols of the signal have been inverted. In some examples, the data re-inversion component 435 may reinvert the one or more data symbols by respectively changing a physical level of at least one data symbol of the one or more data symbols from a first physical level of the at least four (4) physical levels to a second physical level of the at least four (4) physical levels based on determining that one or more of the data symbols of the signal have been inverted.

In some examples, the data re-inversion component 435 may change the first physical level corresponding to an inverted data symbol of the one or more data symbols to the second physical level corresponding to a re-inverted data symbol, where the second physical level is located at an equal distance from the signal axis as the first physical level. In some cases, an initial physical level corresponding to an inverted data symbol of the one or more data symbols is located at an opposite side and at an equal distance from the signal axis as a final signal level corresponding to a re-inverted data symbol associated with the inverted data symbol.

In some examples, the data re-inversion component 435 may change, for each of the one or more data symbols, a value of the most significant bit from a value of 0 to a value of 1 or from a value of 1 to a value of 0.

Figure 5:
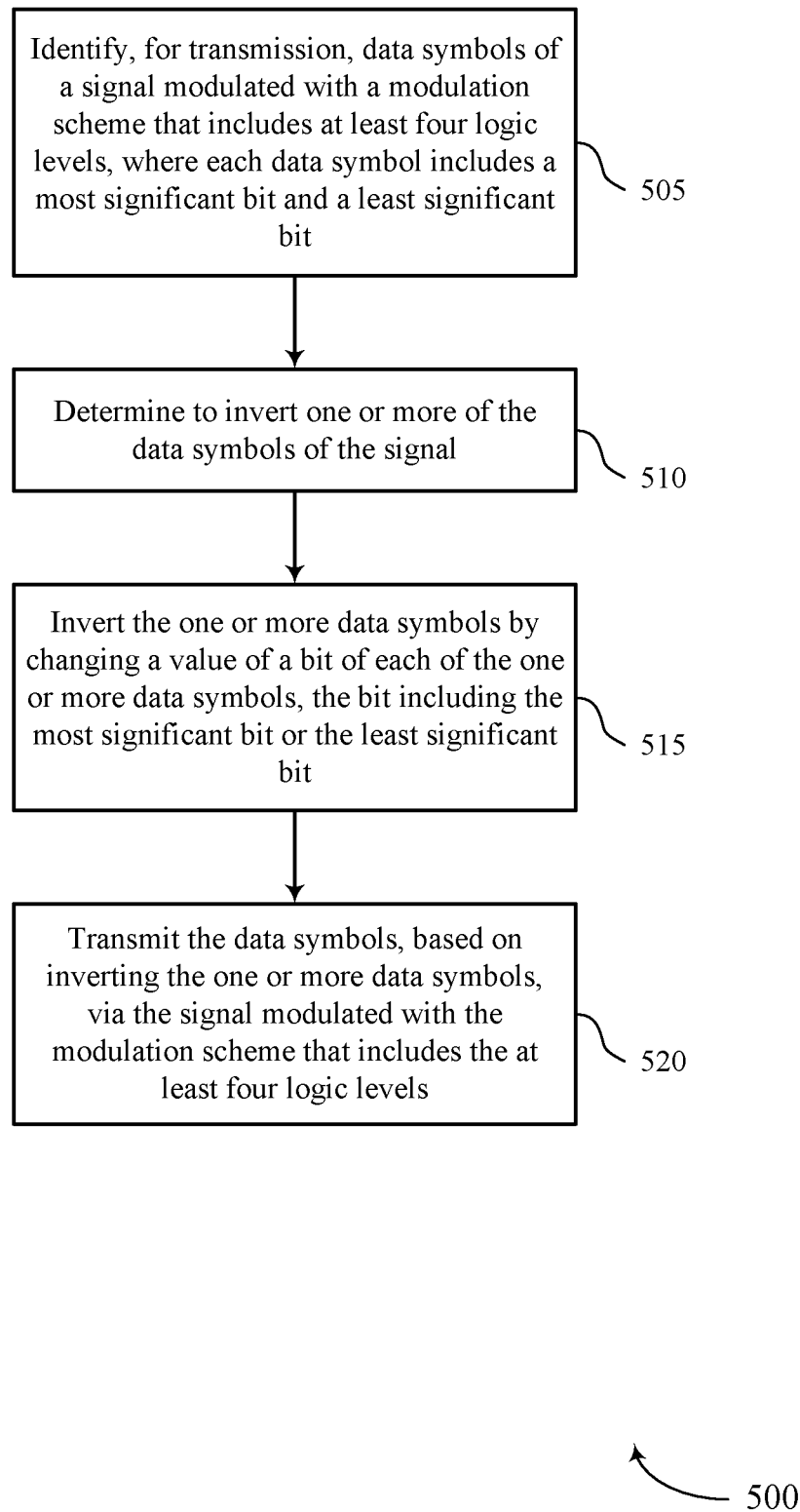
FIGS. 5 through 7 show flowcharts illustrating a method or methods that support data inversion techniques in accordance with examples as disclosed herein.

FIG. 5 shows a flowchart illustrating a method or methods 500 that supports data inversion techniques in accordance with aspects of the present disclosure. The operations of method 500 may be implemented by a memory device or its components as described herein. For example, the operations of method 500 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 505, the memory device may identify, for transmission, data symbols of a signal modulated with a modulation scheme that includes at least four (4) logic levels, where each data symbol includes a most significant bit and a least significant bit. The operations of 505 may be performed according to the methods described herein. In some examples, aspects of the operations of 505 may be performed by a signal identification component as described with reference to FIG. 4.

At 510, the memory device may determine to invert one or more of the data symbols of the signal. The operations of 510 may be performed according to the methods described herein. In some examples, aspects of the operations of 510 may be performed by an inversion determination component as described with reference to FIG. 4.

At 515, the memory device may invert the one or more data symbols by changing a value of a bit of each of the one or more data symbols, the bit including the most significant bit or the least significant bit. The operations of 515 may be performed according to the methods described herein. In some examples, aspects of the operations of 515 may be performed by a data inversion component as described with reference to FIG. 4.

At 520, the memory device may transmit the data symbols, based on inverting the one or more data symbols, via the signal modulated with the modulation scheme that includes the at least four (4) logic levels. The operations of 520 may be performed according to the methods described herein. In some examples, aspects of the operations of 520 may be performed by a signal transmission component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for identifying, for transmission, data symbols of a signal modulated with a modulation scheme that includes at least four (4) logic levels, where each data symbol includes a most significant bit and a least significant bit, determining to invert one or more of the data symbols of the signal, inverting the one or more data symbols by changing a value of a bit of each of the one or more data symbols, the bit including the most significant bit or the least significant bit, and transmitting the data symbols, based on inverting the one or more data symbols, via the signal modulated with the modulation scheme that includes the at least four (4) logic levels.

In some examples of the method 500 and the apparatus described herein, the modulation scheme further includes at least four (4) physical levels, the modulation scheme relating each physical level of the at least four (4) physical levels with a respective logic level of the at least four (4) logic levels.

Some examples of the method 500 and the apparatus described herein may further include operations, features, means, or instructions for mapping a logic level associated with each data symbol of the data symbols to a respective physical level of the at least four (4) physical levels, where transmitting the data symbols via the signal may be based on mapping the logic level associated with each data symbol to the respective physical level.

In some examples of the method 500 and the apparatus described herein, inverting the one or more data symbols may include operations, features, means, or instructions for inverting the one or more data symbols over a signal axis between a highest physical level and a lowest physical level of the at least four (4) physical levels.

In some examples of the method 500 and the apparatus described herein, an initial physical level corresponding to a data symbol of the one or more data symbols may be located at an equal distance from the signal axis as a final physical level corresponding to an inverted data symbol associated with a non-inverted data symbol.

In some examples of the method 500 and the apparatus described herein, inverting the one or more data symbols may include operations, features, means, or instructions for changing, for each of the one or more data symbols, a value of the most significant bit from a value of 0 to a value of 1 or from a value of 1 to a value of 0.

Some examples of the method 500 and the apparatus described herein may further include operations, features, means, or instructions for determining an indication that indicates one or more of the data symbols of the signal may have been inverted, where transmitting the data symbols via the signal includes transmitting the indication via the signal.

Figure 6:
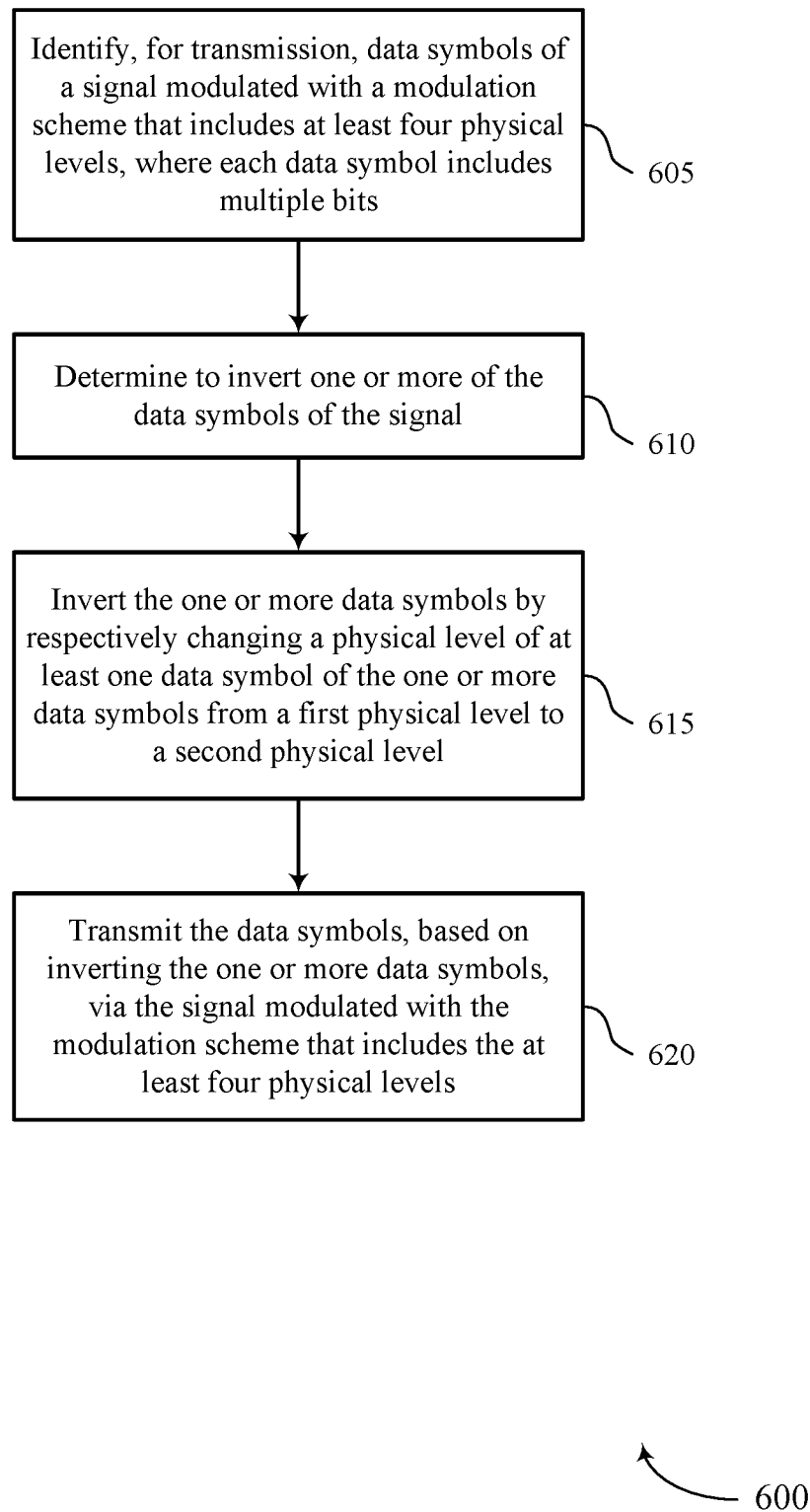

FIG. 6 shows a flowchart illustrating a method or methods 600 that supports data inversion techniques in accordance with aspects of the present disclosure. The operations of method 600 may be implemented by a memory device or its components as described herein. For example, the operations of method 600 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 605, the memory device may identify, for transmission, data symbols of a signal modulated with a modulation scheme that includes at least four (4) physical levels, where each data symbol includes multiple bits. The operations of 605 may be performed according to the methods described herein. In some examples, aspects of the operations of 605 may be performed by a signal identification component as described with reference to FIG. 4.

At 610, the memory device may determine to invert one or more of the data symbols of the signal. The operations of 610 may be performed according to the methods described herein. In some examples, aspects of the operations of 610 may be performed by an inversion determination component as described with reference to FIG. 4.

At 615, the memory device may invert the one or more data symbols by respectively changing a physical level of at least one data symbol of the one or more data symbols from a first physical level to a second physical level. The operations of 615 may be performed according to the methods described herein. In some examples, aspects of the operations of 615 may be performed by a data inversion component as described with reference to FIG. 4.

At 620, the memory device may transmit the data symbols, based on inverting the one or more data symbols, via the signal modulated with the modulation scheme that includes the at least four (4) physical levels. The operations of 620 may be performed according to the methods described herein. In some examples, aspects of the operations of 620 may be performed by a signal transmission component as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for identifying, for transmission, data symbols of a signal modulated with a modulation scheme that includes at least four (4) physical levels, where each data symbol includes multiple bits, determining to invert one or more of the data symbols of the signal, inverting the one or more data symbols by respectively changing a physical level of at least one (1) data symbol of the one or more data symbols from a first physical level to a second physical level, and transmitting the data symbols, based on inverting the one or more data symbols, via the signal modulated with the modulation scheme that includes the at least four (4) physical levels.

Some examples of the method 600 and the apparatus described herein may further include operations, features, means, or instructions for mapping each data symbol of the data symbols with a respective physical level of the at least four (4) physical levels, where transmitting the data symbols may be based on mapping each data symbol with the respective physical level.

In some examples of the method 600 and the apparatus described herein, inverting the one or more data symbols may include operations, features, means, or instructions for inverting the one or more data symbols over a signal axis between a first intermediate physical level and a second intermediate physical level of the at least four (4) physical levels.

In some examples of the method 600 and the apparatus described herein, inverting the one or more data symbols may include operations, features, means, or instructions for changing the first physical level corresponding to a non-inverted data symbol of the one or more data symbols to the second physical level corresponding to an inverted data symbol, where the second physical level may be located at an equal distance from the signal axis as the first physical level.

In some examples of the method 600 and the apparatus described herein, the modulation scheme further includes at least four (4) logic levels that may be each associated with a data symbol, the modulation scheme relating each physical level of the at least four (4) physical levels with a respective logic level of the at least four (4) logic levels.

Some examples of the method 600 and the apparatus described herein may further include operations, features, means, or instructions for determining an indication that indicates one or more of the data symbols of the signal may have been inverted, where transmitting the data symbols via the signal includes transmitting the indication via the signal.

Figure 7:
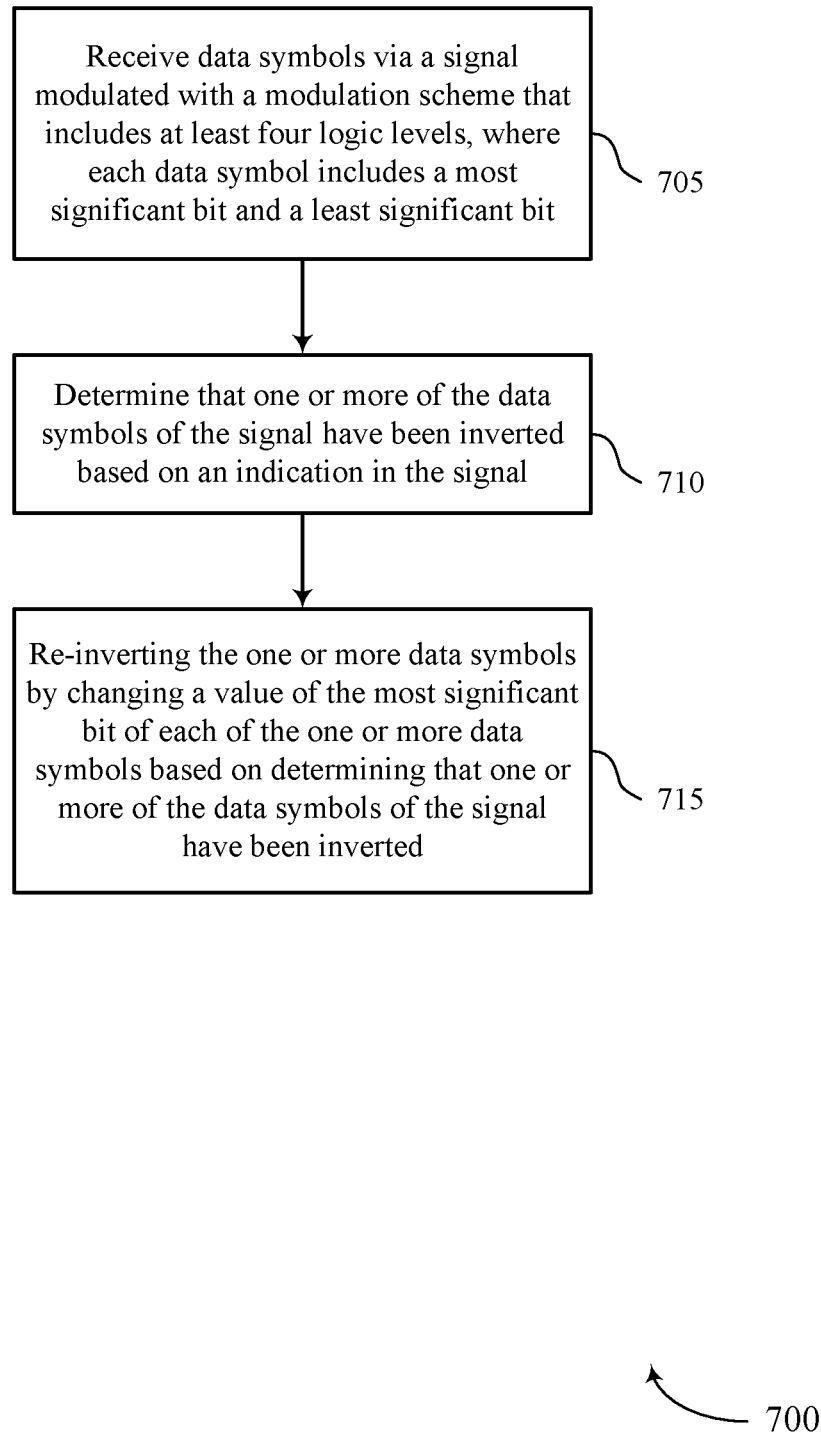

FIG. 7 shows a flowchart illustrating a method or methods 700 that supports data inversion techniques in accordance with aspects of the present disclosure. The operations of method 700 may be implemented by a memory device or its components as described herein. For example, the operations of method 700 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 705, the memory device may receive data symbols via a signal modulated with a modulation scheme that includes at least four (4) logic levels, where each data symbol includes a most significant bit and a least significant bit. The operations of 705 may be performed according to the methods described herein. In some examples, aspects of the operations of 705 may be performed by a signal reception component as described with reference to FIG. 4.

At 710, the memory device may determine that one or more of the data symbols of the signal have been inverted based on an indication in the signal. The operations of 710 may be performed according to the methods described herein. In some examples, aspects of the operations of 710 may be performed by an inversion determination component as described with reference to FIG. 4.

At 715, the memory device may reinvert the one or more data symbols by changing a value of the most significant bit of each of the one or more data symbols based on determining that one or more of the data symbols of the signal have been inverted. The operations of 715 may be performed according to the methods described herein. In some examples, aspects of the operations of 715 may be performed by a data re-inversion component as described with reference to FIG. 4.

In some examples, an apparatus as described herein may perform a method or methods, such as the method 700. The apparatus may include features, means, or instructions (e.g., a non-transitory computer-readable medium storing instructions executable by a processor) for receiving data symbols via a signal modulated with a modulation scheme that includes at least four (4) logic levels, where each data symbol includes a most significant bit and a least significant bit, determining that one or more of the data symbols of the signal have been inverted based on an indication in the signal, and reinverting the one or more data symbols by changing a value of the most significant bit of each of the one or more data symbols based on determining that one or more of the data symbols of the signal have been inverted.

In some examples of the method 700 and the apparatus described herein, determining that the one or more data symbols may have been inverted based on the indication may include operations, features, means, or instructions for determining that one or more of the data symbols of the signal may have been inverted based on a value of a field of the signal, a value of a symbol of the signal, a value of a bit of the signal, the modulation scheme of the signal, or any combination thereof.

In some examples of the method 700 and the apparatus described herein, the modulation scheme further includes at least four (4) physical levels, the modulation scheme relating each physical level of the at least four (4) physical levels with a respective logic level of the at least four (4) logic levels.

In some examples of the method 700 and the apparatus described herein, the signal may include operations, features, means, or instructions for mapping the at least one (1) physical level of the signal with the respective logic level, the respective logic level associated with a data symbol of the data symbols, where receiving the data symbols may be based on mapping the at least one (1) physical level with the respective data symbol.

In some examples of the method 700 and the apparatus described herein, the modulation scheme includes a signal axis at a physical level between a highest physical level and a lowest physical level of the at least four (4) physical levels.

In some examples of the method 700 and the apparatus described herein, an initial physical level corresponding to an inverted data symbol of the one or more data symbols may be located at an opposite side and at an equal distance from the signal axis as a final signal level corresponding to a re-inverted data symbol associated with the inverted data symbol.

In some examples of the method 700 and the apparatus described herein, re-inverting the one or more data symbols may include operations, features, means, or instructions for changing, for each of the one or more data symbols, a value of the most significant bit from a value of 0 to a value of 1 or from a value of 1 to a value of 0.

It should be noted that the methods described herein describe possible implementations, and that the operations and the steps may be rearranged or otherwise modified and that other implementations are possible. Furthermore, portions from two or more of the methods may be combined.

An apparatus is described. The apparatus may include a controller configured to identify data symbols of a signal and determine to invert one or more of the data symbols of the signal, where the signal is modulated with a modulation scheme that includes at least four (4) logic levels, and where each data symbol includes a most significant bit and a least significant bit, an encoder coupled with the controller and configured to invert the one or more data symbols by changing a value of a bit of each of the one or more data symbols, the bit including the most significant bit or the least significant bit, and a transmitter coupled with the encoder and configured to transmit the data symbols, based on inverting the one or more data symbols, via the signal modulated with the modulation scheme that includes the at least four (4) logic levels.

In some examples, the modulation scheme further includes at least four (4) physical levels, the modulation scheme relating each physical level of the at least four (4) physical levels with a respective logic level of the at least four (4) logic levels.

Some examples may further include mapping a logic level associated with each data symbol of the data symbols with a respective physical level of the at least four (4) physical levels, where transmitting the data symbols via the signal may be based on mapping the logic level associated with each data symbol to the respective physical level.

Some examples may further include changing, for each of the one or more data symbols, a value of the most significant bit from a value of 0 to a value of 1 or from a value of 1 to a value of 0.

Some examples may further include determining an indication that indicates one or more of the data symbols of the signal may have been inverted, where transmitting the data symbols via the signal includes transmitting the indication via the signal.

An apparatus is described. The apparatus may include a receiver configured to receive data symbols via a signal modulated with a modulation scheme that includes at least four (4) logic levels, where each data symbol includes a most significant bit and a least significant bit, a controller coupled with the receiver and configured to determine that one or more of the data symbols of the signal have been inverted based on an indication in the signal, and a decoder coupled with the receiver and configured to re-invert the one or more data symbols by changing a value of the most significant bit of each of the one or more data symbols based on determining that one or more of the data symbols of the signal have been inverted.

In some examples, the modulation scheme further includes at least four (4) physical levels, the modulation scheme relating each physical level of the at least four (4) physical levels to a respective logic level of the at least four (4) logic levels.

Some examples may further include mapping at least one (1) physical level of the at least four (4) physical levels with the respective logic level, the respective logic level associated with a data symbol of the data symbols.

Some examples may further include changing, for each of the one or more data symbols, a value of the most significant bit from a value of 0 to a value of 1 or from a value of 1 to a value of 0.

Some examples may further include determining that one or more of the data symbols of the signal may have been inverted based on a value of a field of the signal, a value of a symbol of the signal, a value of a bit of the signal, the modulation scheme of the signal, or any combination thereof.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two (2) components separated by a switch that is positioned between the components are isolated from each other when the switch is open. When a controller isolates two (2) components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three (3) terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   identifying, for transmission, data symbols of a signal modulated with a modulation scheme that includes at least four physical levels, wherein each data symbol comprises multiple bits;
   determining to invert one or more data symbols of the data symbols of the signal;
   inverting the one or more data symbols by respectively changing a physical level of at least one data symbol of the one or more data symbols from a first physical level to a second physical level; and transmitting the data symbols, based at least in part on inverting the one or more data symbols, via the signal modulated with the modulation scheme that includes the at least four physical levels.

2. The method of claim 1, further comprising:
mapping each data symbol of the data symbols with a respective physical level of the at least four physical levels, wherein transmitting the data symbols is based at least in part on mapping each data symbol with the respective physical level.

3. The method of claim 1, wherein inverting the one or more data symbols comprises:
inverting the one or more data symbols over a signal axis between a first intermediate physical level and a second intermediate physical level of the at least four physical levels.

4. The method of claim 1, wherein the modulation scheme further comprises at least four logic levels that are each associated with a data symbol, the modulation scheme relating each physical level of the at least four physical levels with a respective logic level of the at least four logic levels.

5. The method of claim 1, further comprising:
determining an indication that indicates one or more of the data symbols of the signal have been inverted, wherein transmitting the data symbols via the signal comprises transmitting the indication via the signal.

6. The method of claim 1, wherein the first physical level comprises a highest physical level of the at least four physical levels and the second physical level comprises a lowest physical level of the at least four physical levels.

7. A method, comprising:
identifying, for transmission, data symbols of a signal modulated with a modulation scheme that includes at least four physical levels, wherein each data symbol comprises multiple bits;
determining to invert one or more data symbols of the data symbols of the signal;
inverting the one or more data symbols by respectively changing a physical level of at least one data symbol of the one or more data symbols from a first physical level to a second physical level, wherein inverting the one or more data symbols comprises inverting the one or more data symbols over a signal axis between a first intermediate physical level and a second intermediate physical level of the at least four physical levels and changing the first physical level corresponding to a non-inverted data symbol of the one or more data symbols to the second physical level corresponding to an inverted data symbol, wherein the second physical level is located at an equal distance from the signal axis as the first physical level; and
transmitting the data symbols, based at least in part on inverting the one or more data symbols, via the signal modulated with the modulation scheme that includes the at least four physical levels.

8. A method, comprising:
receiving data symbols via a signal modulated with a modulation scheme that includes at least four physical levels, wherein each data symbol comprises multiple bits;
determining that one or more data symbols of the data symbols of the signal have been inverted based at least in part on an indication in the signal; and
re-inverting the one or more data symbols by respectively changing a physical level of at least one data symbol of the one or more data symbols from a first physical level of the at least four physical levels to a second physical level of the at least four physical levels based at least in part on determining that one or more of the data symbols of the signal have been inverted.

9. The method of claim 8, wherein the signal comprises at least one physical level of the at least four physical levels, the method further comprising:
mapping the at least one physical level of the signal with a respective data symbol of the data symbols, wherein receiving the data symbols is based at least in part on mapping the at least one physical level with the respective data symbol.

10. The method of claim 8, wherein determining that the one or more data symbols have been inverted based at least in part on the indication comprises:
determining that one or more of the data symbols of the signal have been inverted based at least in part on a value of a field of the signal, a value of a symbol of the signal, a value of a bit of the signal, the modulation scheme of the signal, or any combination thereof.

11. The method of claim 8, wherein the modulation scheme comprises a signal axis at a physical level at half of a distance between a first intermediate physical level and a second intermediate physical level of the at least four physical levels.

12. The method of claim 8, wherein the modulation scheme further includes at least four logic levels that are each associated with a data symbol, the modulation scheme relating each physical level of the at least four physical levels with a respective logic level of the at least four logic levels.

13. The method of claim 8, wherein the first physical level comprises a highest physical level of the at least four physical levels and the second physical level comprises a lowest physical level of the at least four physical levels.

14. The method of claim 8, wherein the indication in the signal comprises a value of a field of the signal, a value of a symbol of the signal, a value of a bit of the signal, the modulation scheme of the signal, or a combination thereof.

15. A method, comprising:
receiving data symbols via a signal modulated with a modulation scheme that includes at least four physical levels, wherein each data symbol comprises multiple bits, and wherein the modulation scheme comprises a signal axis at a physical level at half of a distance between a first intermediate physical level and a second intermediate physical level of the at least four physical levels;
determining that one or more data symbols of the data symbols of the signal have been inverted based at least in part on an indication in the signal; and
re-inverting the one or more data symbols by respectively changing a physical level of at least one data symbol of the one or more data symbols from a first physical level of the at least four physical levels to a second physical level of the at least four physical levels based at least in part on determining that one or more of the data symbols of the signal have been inverted, wherein re-inverting the one or more data symbols comprises changing the first physical level corresponding to an inverted data symbol of the one or more data symbols to the second physical level corresponding to a re-inverted data symbol, wherein the second physical level is located at an equal distance from the signal axis as the first physical level.

16. A memory device, comprising:
- a receiver configured to receive data symbols via a signal modulated with a modulation scheme that includes at least four logic levels, wherein each data symbol comprises a most significant bit and a least significant bit;
- one or more controllers coupled with the receiver and configured to determine that one or more data symbols of the data symbols of the signal have been inverted based at least in part on an indication in the signal; and
- a decoder coupled with the receiver and configured to re-invert the one or more data symbols by changing a value of the most significant bit of each of the one or more data symbols based at least in part on determining that one or more of the data symbols of the signal have been inverted.

17. The memory device of claim 16, wherein the modulation scheme further comprises at least four physical levels, the modulation scheme relating each physical level of the at least four physical levels to a respective logic level of the at least four logic levels.

18. The memory device of claim 17, wherein the one or more controllers are further configured to:
- map at least one physical level of the at least four physical levels with the respective logic level, the respective logic level associated with a data symbol of the data symbols.

19. The memory device of claim 16, wherein the decoder is further configured to:
- change, for each of the one or more data symbols, a value of the most significant bit from a value of 0 to a value of 1 or from a value of 1 to a value of 0.

20. The memory device of claim 16, wherein the one or more controllers are further configured to:
- determine that one or more of the data symbols of the signal have been inverted based at least in part on a value of a field of the signal, a value of a symbol of the signal, a value of a bit of the signal, the modulation scheme of the signal, or any combination thereof.

* * * * *